United States Patent
Masuki (10) Patent No.: US 9,958,637 B2
(45) Date of Patent: May 1, 2018

(54) OPTICAL DEVICE HAVING IMPROVED IMPACT RESISTANCE

(71) Applicant: CANON KABUSHIKI KAISHA, Tokyo (JP)

(72) Inventor: Akihiko Masuki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 300 days.

(21) Appl. No.: 14/341,915

(22) Filed: Jul. 28, 2014

(65) Prior Publication Data
US 2015/0036227 A1 Feb. 5, 2015

(30) Foreign Application Priority Data
Jul. 30, 2013 (JP) .................. 2013-157565

(51) Int. Cl.
G02B 15/14 (2006.01)
G02B 7/10 (2006.01)

(52) U.S. Cl.
CPC .................. *G02B 7/102* (2013.01)

(58) Field of Classification Search
CPC ........ G02B 7/102; G02B 7/10; G02B 27/646; G02B 7/02; G02B 7/021; G02B 7/022; G02B 13/004; G02B 13/009; G02B 7/105; G02B 7/09; G03B 17/04; G03B 9/02; G03B 2205/0046; G03B 2205/0007; G03B 5/02; G03B 9/08; H04N 5/2254; H04N 5/23296; H04N 5/23248
USPC ........................................... 359/817
See application file for complete search history.

(56) References Cited

U.S. PATENT DOCUMENTS

| 7,876,514 B2 | 1/2011 | Kaneko et al. |
| 8,023,201 B2 | 9/2011 | Oya |
| 2011/0194198 A1* | 8/2011 | Iida .................. G02B 7/102 359/817 |

(Continued)

FOREIGN PATENT DOCUMENTS

| CN | 101373250 A | 2/2009 |
| CN | 101995636 A | 3/2011 |
| JP | 2012242727 A | 12/2012 |

OTHER PUBLICATIONS

Official Action issued in counterpart Chinese Appln. No. 201410371391.8 dated Mar. 15, 2016. English translation provided.

*Primary Examiner* — Alicia M Harrington
(74) *Attorney, Agent, or Firm* — Rossi, Kimms & McDowell LLP (57) ABSTRACT

An optical device whose impact resistance against an impact improved without increasing the size thereof. A first-group lens barrel holds has radially protruding follower pins formed thereon. A cam ring is disposed outside the first-group lens barrel, and has cam grooves formed therein for engagement with the follower pins. A diaphragm unit disposed rearward of the first-group lens barrel and a second-group lens barrel disposed rearward of the diaphragm unit move in the optical axis direction. When the diaphragm unit and the second-group lens barrel move in the optical axis direction, the optical device is switched between a wide angle position in which first protrusions formed on the diaphragm unit are positioned inside the follower pins and a telephoto position in which third protrusions formed on the second-group lens barrel are positioned inside the same.

8 Claims, 12 Drawing Sheets

(56) References Cited

U.S. PATENT DOCUMENTS

2012/0003310 A1  1/2012  Safadi et al.
2012/0033310 A1  1/2012  Safadi et al.
2012/0300314 A1  11/2012 Ooya

* cited by examiner

FIG. 12

OPTICAL DEVICE HAVING IMPROVED IMPACT RESISTANCE

BACKGROUND OF THE INVENTION

Field of the Invention

The invention relates to an optical device having improved impact resistance, and more particularly to an optical device having improved impact resistance, which is used in an image pickup apparatus, such as a film camera or a digital camera.

Description of the Related Art

There has been known a photographic lens barrel provided with a zoom mechanism for moving a plurality of optical lenses along the optical axis to thereby change the photographing magnification. The zoom mechanism includes, for example, a type in which a lens holding frame holding an optical lens is engaged with cam grooves of a rotary cam barrel, and the lens holding frame is moved along the optical axis while restricting rotation of the lens holding frame using a rectilinear motion barrel.

In the photographic lens barrel thus constructed, it is required to improve impact resistance so as to prevent disengagement of the components when an external force, such as an impact, acts on the photographic lens barrel. To improve the impact resistance of the photographic lens barrel, there have been proposed a method of strengthening the whole photographic lens barrel by increasing the rigidity of each component, and a method of using elastic members for some of the components of the photographic lens barrel and further absorbing an impact by filling cushioning material therebetween.

As the method of increasing the rigidity of each component, there has been employed a method of selecting a stronger material, a method of increasing the thickness of each component, a method of reinforcing the peripheral portions of shock-sensitive components, etc. Further, in this method of reinforcing the peripheral portions of shock-sensitive components, the construction itself of the photographic lens barrel and the shape of each component are elaborately designed. For example, there has been proposed a construction in which a rear group lens-holding frame has an outer shape configured to support, from inside, the follower pins of a front group lens-holding frame for cam-driving the lens holding frames, so as to prevent the follower pins from being disengaged from the cam grooves of a cam ring when an impact is applied to the photographic lens barrel due to a drop or the like (see Japanese Patent Laid-Open Publication No. 2012-242727). By applying the above-mentioned relationship to a plurality of lens groups within the photographic lens barrel to provide a structure in which the lens holding frames support each other, it is possible to improve the impact resistance of the photographic lens barrel to prevent the cam followers from being disengaged due to an impact, thereby contributing to improvement of reliability of the photographic lens barrel.

However, in the invention disclosed in Japanese Patent Laid-Open Publication No. 2012-242727, the outer shape of the rear group lens-holding frame is configured to support the follower pins of the front group lens-holding frame from inside, and hence the thickness of the overlapping portions of the lens holding frames is increased in the radial direction. Therefore, with an increase in the number of lens groups arranged such that they have the above-mentioned relationship, the outer diameter of the front group lens-holding frame is increased. As a consequence, the outer diameter of the photographic lens barrel is increased, resulting in an increase in the size of the whole image pickup apparatus.

SUMMARY OF THE INVENTION

The invention provides an optical device whose impact resistance against an impact e.g. due to a drop is improved without increasing the size of the optical device.

The invention provides an optical device comprising a lens holding member configured to hold a lens, and having follower pins formed thereon in a radially protruding manner, a cam member disposed outside the lens holding member and having cam grooves formed therein for engagement with the follower pins, a first moving member disposed rearward of the lens holding member in an optical axis direction and configured to move in the optical axis direction, and a second moving member disposed rearward of the first moving member in the optical axis direction and configured to move in the optical axis direction, wherein the first moving member has first portions formed thereon, wherein the second moving member has second portions formed thereon, and wherein in a case where the first moving member and the second moving member move in the optical axis direction, the optical device is switched between a first state in which the first portions are positioned inside the follower pins and a second state in which the second portions are positioned inside the follower pins.

According to the invention, it is possible to improve the impact resistance of the optical device against an impact e.g. due to a drop without increasing the size of the optical device.

Further features of the invention will become apparent from the following description of exemplary embodiments (with reference to the attached drawings).

DESCRIPTION OF THE EMBODIMENTS

The invention will now be described in detail below with reference to the accompanying drawings showing an embodiment thereof.

Figure 1:
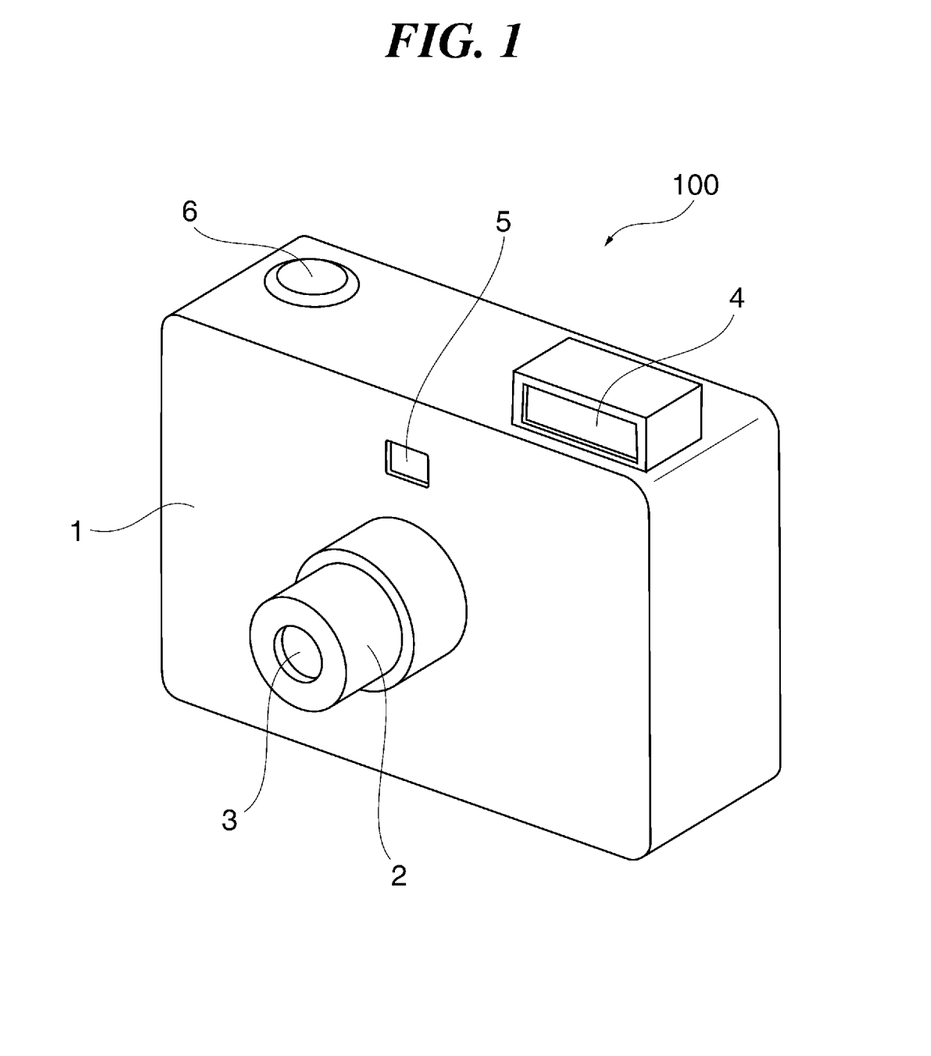
FIG. 1 is a perspective view of the appearance of an image pickup apparatus including a photographic lens barrel as an optical device according to an embodiment of the invention.

FIG. 1 is a perspective view of the appearance of an image pickup apparatus 100 including an optical device according to the embodiment of the invention. Note that an image pickup apparatus including the optical device according to the present embodiment may have an appearance different from that of the image pickup apparatus 100 shown in FIG. 1.

On the front surface of a camera body 1 of the image pickup apparatus 100, there is disposed a photographic lens barrel 2 as the optical device according to the present embodiment, which is capable of changing the focal distance of a photographic lens (not shown). To the front of the photographic lens barrel 2, there is attached a lens barrier device 3 for opening and closing the optical path in accordance with the powering on and off of the image pickup apparatus 100. On the upper surface of the camera body 1, there is disposed a light-emitting window 4 as a component of a strobe device for emitting illumination light toward an object, and in the front surface of the camera body 1, there is formed a finder window 5. Further, on the upper surface of the camera body 1, there is provided a release button 6 for starting a photographing preparation operation (focus adjustment, photometry, etc.) and a photographing operation (exposure of a film or an image sensor (image pickup device) with light).

Figure 2:
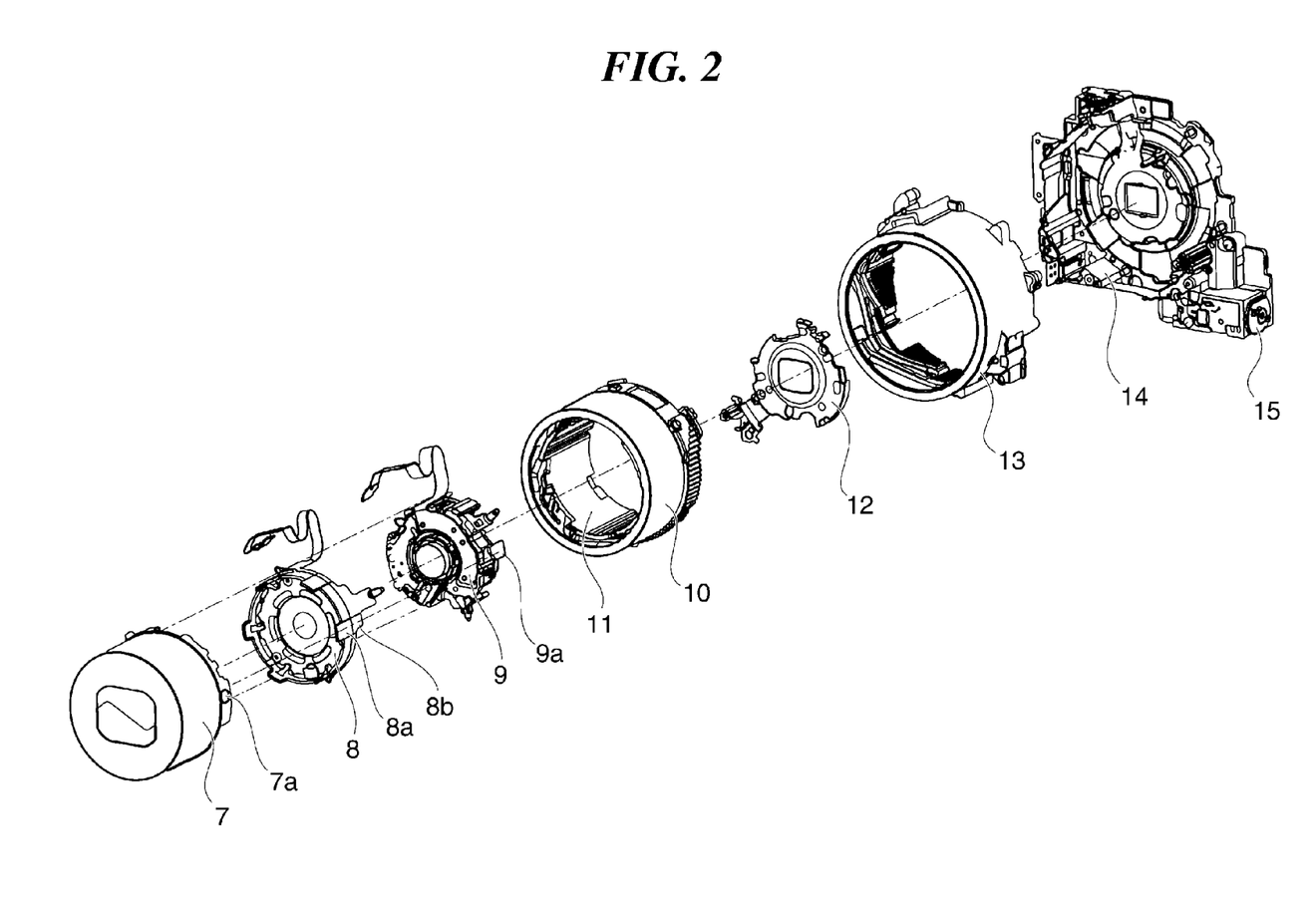
FIG. 2 is an exploded perspective view of the photographic lens barrel appearing in FIG. 1.

FIG. 2 is an exploded perspective view of the photographic lens barrel 2 included in the image pickup apparatus 100. The photographic lens barrel 2 is comprised of a first-group lens barrel 7, a diaphragm unit 8, a second-group lens barrel 9, a cam ring 10, a rectilinear motion barrel 11, a third-group lens barrel 12, a fixed barrel 13, an image pickup device-holding member 14, and a barrel drive motor 15. The first-group lens barrel 7 is an example of a lens holding member configured to hold a lens, and having follower pins 7a formed thereon in a radially protruding manner. The diaphragm unit 8 is an example of a first moving member disposed rearward of the first-group lens barrel 7 in an optical axis direction and configured to move in the optical axis direction. The second-group lens barrel 9 is an example of a second moving member disposed rearward of the diaphragm unit 8 in the optical axis direction and configured to move in the optical axis direction. The cam ring 10 is an example of a cam member disposed outside the first-group lens barrel 7 and having cam grooves formed therein for engagement with the follower pins 7a. The rectilinear motion barrel 11 is an example of a guide member configured to guide the first-group lens barrel 7, the diaphragm unit 8, and the second-group lens barrel 9 such that the first-group lens barrel 7, the diaphragm unit 8, and the second-group lens barrel 9 move rectilinearly in the optical axis direction, when the cam ring 10 is rotated.

The first-group lens barrel 7 holds a first-group photographic lens L1 (see FIGS. 6 to 12) which is a first lens group. The first-group lens barrel 7 is provided with the lens barrier device 3. The diaphragm unit 8 is disposed radially inside the first-group lens barrel 7 and is provided with a diaphragm mechanism (light amount adjustment unit). The second-group lens barrel 9 is also disposed radially inside the first-group lens barrel 7 and holds a second-group photographic lens L2 (see FIGS. 6 to 12) which is a second lens group. The second-group lens barrel 9 is provided with an anti-shake mechanism and a shutter mechanism (shutter unit). The cam ring 10 has a drive cam provided on the inner peripheral surface thereof, for driving the first-group lens barrel 7, the diaphragm unit 8, and the second-group lens barrel 9, and includes a gear section for receiving a drive force transmitted from the barrel drive motor 15.

The rectilinear motion barrel 11 is formed with rectilinear motion grooves for guiding the first-group lens barrel 7, the diaphragm unit 8, and the second-group lens barrel 9 in the optical axis direction while restricting the direction of motion of the members to a direction of rectilinear motion. The rectilinear motion barrel 11 is rotatably held by the cam ring 10 and moves in the optical axis direction in unison with the cam ring. The third-group lens barrel 12 holds a third-group photographic lens L3 (see FIGS. 6 to 12) which is a third lens group. The fixed barrel 13 has a drive cam provided on the inner peripheral surface thereof, for driving the cam ring 10. The image pickup device-holding member 14 holds an image pickup device (image sensor formed by a photoelectric conversion device, such as a CCD sensor or a CMOS sensor). Note that the photographic lens barrel as the optical device according to the present embodiment can have any suitable construction insofar as the construction satisfies the features of the present embodiment described below, and therefore the construction of the photographic lens barrel is not limited to the example shown in FIG. 2.

Figure 3:
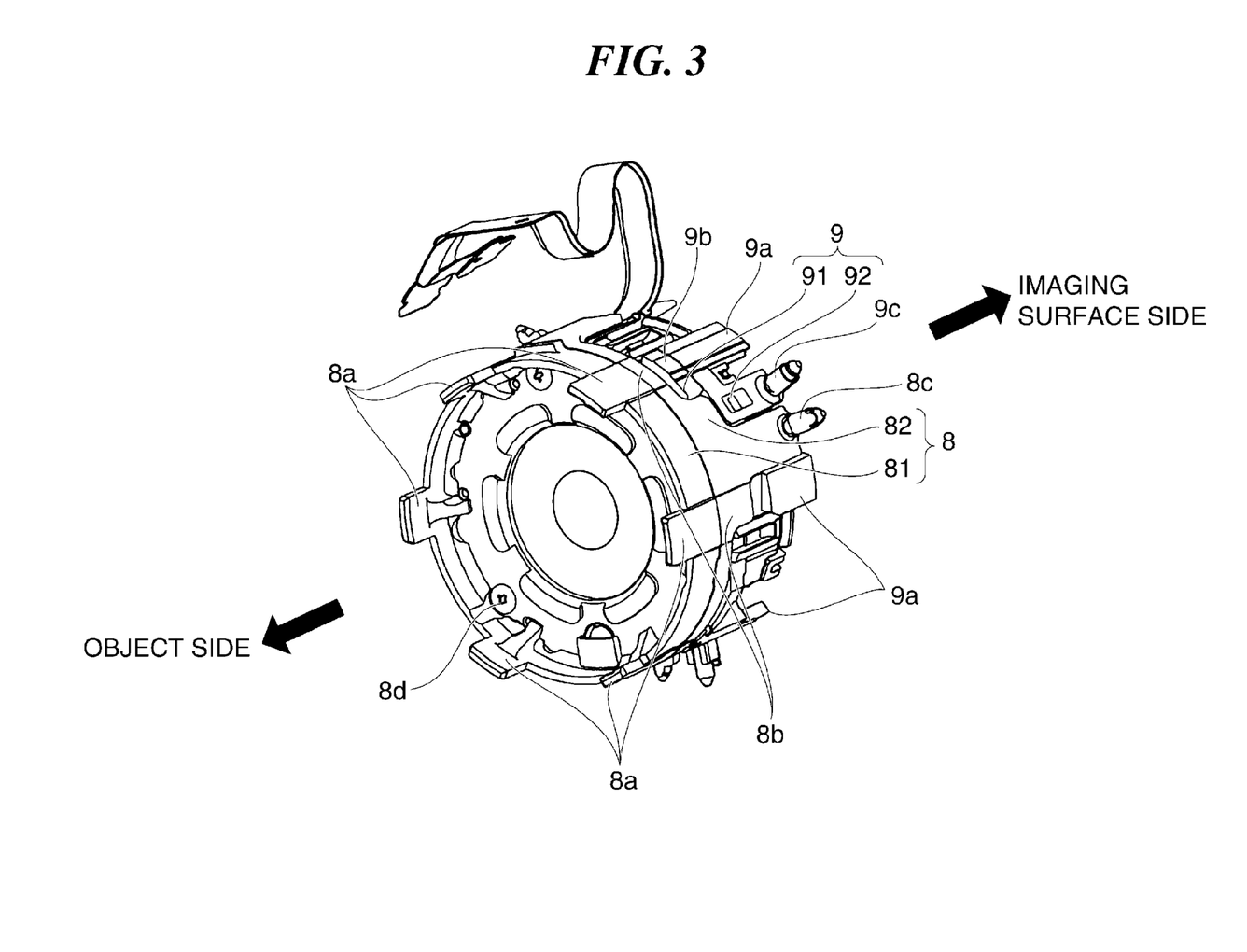
FIG. 3 is a perspective view of a diaphragm unit and a second-group lens barrel included in the photographic lens barrel shown in FIG. 2.
Figure 4A:
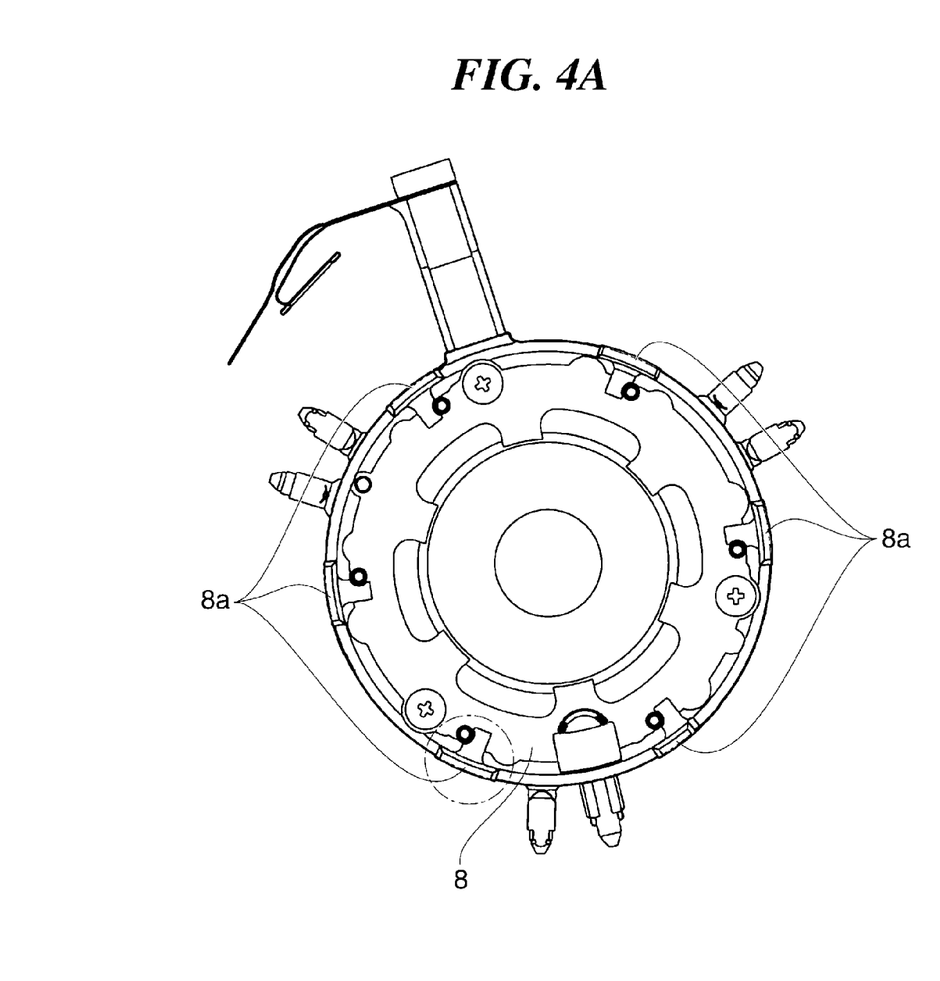
FIG. 4A is a front view of the diaphragm unit and the second-group lens barrel in FIG. 3, as viewed from the object side.
Figure 4B:
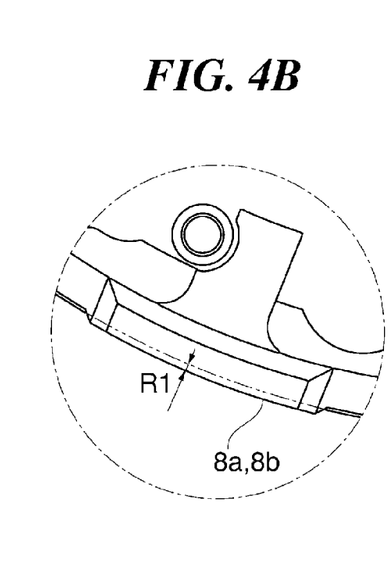
FIG. 4B is a partially enlarged view of FIG. 4A.
Figure 5A:
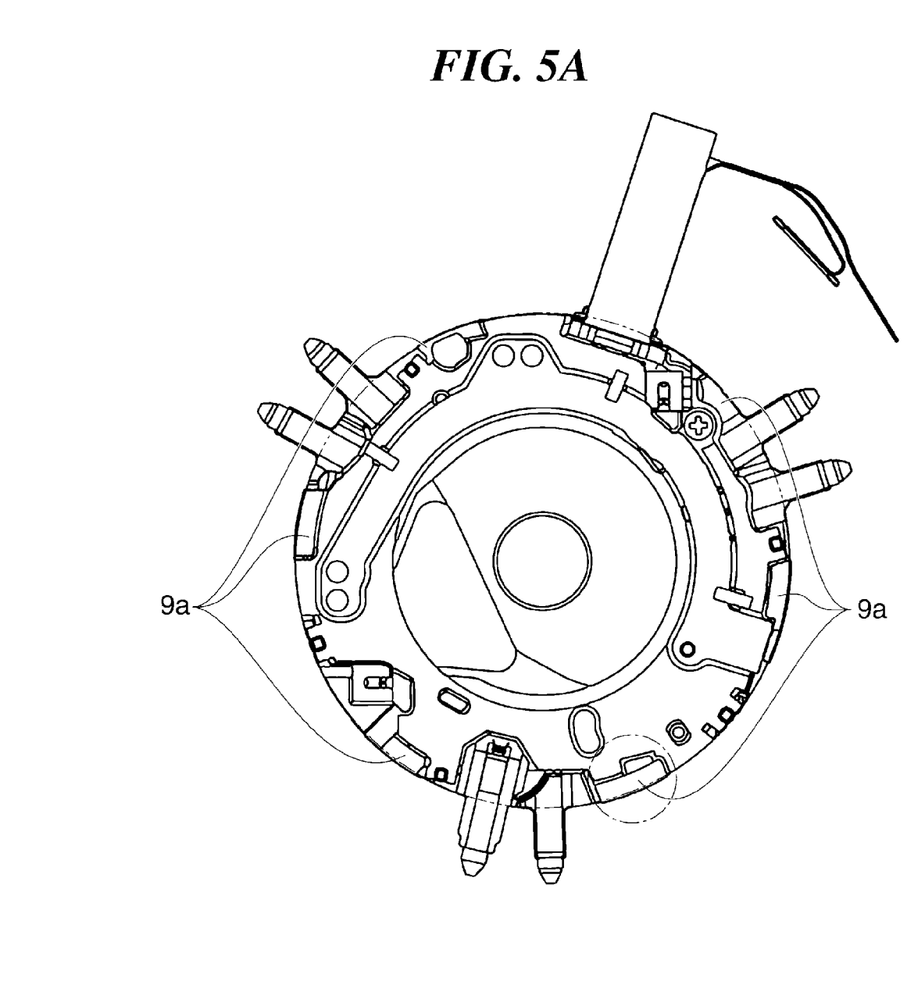
FIG. 5A is a rear view of the diaphragm unit and the second-group lens barrel in FIG. 3, as viewed from the imaging surface side.
Figure 5B:
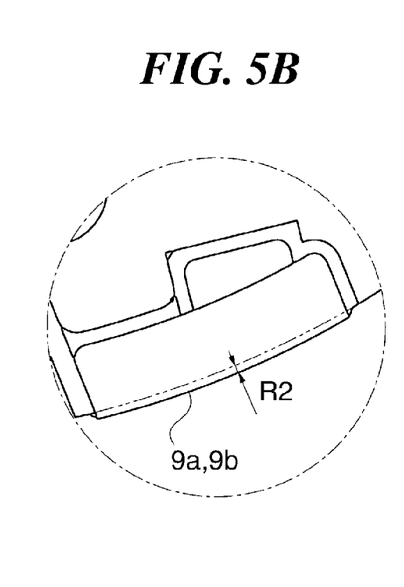
FIG. 5B is a partially enlarged view of FIG. 5A.

Next, a description will be given of the structure of the diaphragm unit 8 and the second-group lens barrel 9. FIG. 3 is a perspective view of the diaphragm unit 8 and the second-group lens barrel 9. FIG. 4A is a view (front view) of the diaphragm unit 8 and the second-group lens barrel 9 shown in FIG. 3, as viewed from the object side. FIG. 4B is an enlarged view of a portion encircled by a one-dot chain line in FIG. 4A. FIG. 5A is a view (rear view) of the diaphragm unit 8 and the second-group lens barrel 9 shown in FIG. 3, as viewed from the imaging surface side. FIG. 5B is an enlarged view of a portion encircled by a one-dot chain line in FIG. 5A.

As shown in FIG. 3, the diaphragm unit 8 is roughly comprised of a cover member 81 disposed on the object side and a base member 82 having three follower portions 8c arranged on the imaging surface side for engagement with respective associated ones of the cam grooves formed in the cam ring 10. The cover member 81 and the base member 82 are combined with (fixed to) each other by screws 8d, with diaphragm blades, a diaphragm drive member, and so forth (none of which are shown) sandwiched therebetween.

The cover member 81 has six first protrusions 8a formed in a manner protruding toward the object side. Three of the six first protrusions 8a are at respective locations substantially identical in phase to respective locations of three follower pins 7a arranged on the first-group lens barrel 7 at equal circumferential intervals of 120°, and the other three first protrusions 8a are arranged in a manner opposed to these three with the optical axis positioned therebetween. In short, the six first protrusions 8a are arranged at equal circumferential intervals of 60°. The first protrusions 8a are an example of first portions.

The base member 82 has six second protrusions 8b protruding outward from the outer peripheral surface thereof at respective locations substantially identical in phase to the locations of the follower pins 7a associated therewith. As shown in FIGS. 4A and 4B, each of the second protrusions 8b is located on the imaging surface side of the associated one of the first protrusions 8a. The six first protrusions 8a and the six second protrusions 8b radially protrude outward by a protrusion amount R1, but extend in the optical axis direction in a smooth continuous manner without steps therebetween.

The second-group lens barrel 9 has the anti-shake mechanism and the shutter mechanism, as mentioned hereinbefore. The second-group lens barrel 9 is comprised of a holding member 91 disposed on the object side, for holding a position sensor of the anti-mechanism, and a base member 92 disposed on the imaging surface side, and having three follower portions 9c for engagement with respective associated ones of the cam grooves of the cam ring 10. The holding member 91 and the base member 92 are fixedly combined by an elastic member, such as a snap-fit member, in a state sandwiching the anti-shake lens and the like, not shown. The second-group lens barrel 9 has a total of six third protrusions 9a, i.e. five third protrusions 9a protruding toward the imaging surface side from the base member 92 and one third protrusion 9a protruding toward the imaging surface side from the holding member 91. Three of the six third protrusions 9a are arranged at respective locations substantially identical in phase to the locations of the three follower pins 7a arranged on the first-group lens barrel 7 at the equal circumferential intervals of 120°, and the other three third protrusions 9a are arranged in a manner opposed to the these three with the optical axis positioned therebetween. In short, the six third protrusions 9a are arranged at equal circumferential intervals of 60°. The third protrusions 9a are an example of second portions.

The holding member 91 has six forth protrusions 9b protruding outward from the outer peripheral surface thereof at locations substantially identical in phase to the locations of the follower pins 7a. As shown in FIGS. 5A and 5B, the forth protrusions 9b are located on the object side of the third protrusions 9a. The six third protrusions 9a and the six forth protrusions 9b radially protrude outward by a protrusion amount R2, but extend in the optical axis direction in a smooth continuous manner without steps therebetween.

It is preferable that the radial protrusion amount R1 of the first protrusions 8a and the second protrusions 8b provided on the diaphragm unit 8 and the radial protrusion amount R2 of the third protrusions 9a and the fourth protrusions 9b provided on the second-group lens barrel 9 are set equal to each other (R1=R2) so as not to form any steps between the protrusions. The diaphragm unit 8 and the second-group lens barrel 9 move in the optical axis direction substantially in the same fashion, though with relative motion to each other to some extent, and hence they are not separated largely from each other. In the present embodiment, by setting R1 and R2 equal to each other (R1=R2), a structure is provided in which the radially protruding first to fourth protrusions 8a, 8b, 9a, and 9b are formed at six locations on the diaphragm unit 8 and the second-group lens barrel 9 such that each associated protrusions extend in phase with each other in a substantially continuous manner.

Although in the present embodiment, the six third protrusions 9a protruding toward the imaging surface side of the second-group lens barrel 9 extend outward from both the holding member 91 and the base member 92, this is not limitative, but the photographic lens barrel 2 may have a structure in which the six third protrusions 9a all extend outward from either the holding member 91 or the base member 92. Further, in the present embodiment, the six first protrusions 8a and the six third protrusions 9a are formed such that three of the first protrusions 8a and three of the third protrusions 9a are at locations substantially identical in phase to the locations of the follower pins 7a formed on the first-group lens barrel 7 at the equal circumferential intervals of 120°, and the other three of the first protrusions 8a and the other three of the third protrusions 9a are opposed to the former three protrusions 8a and the former three third protrusions 9a with the optical axis positioned therebetween, but this is not limitative either, but only three first protrusions 8a and only three third protrusions 9a may be arranged at respective locations substantially identical in phase to the locations of the follower pins 7a.

However, when the first protrusions 8a and/or the third protrusions 9a are provided at the locations opposed in phase to the locations of the follower pins 7a as in the present embodiment, a gap in the radial direction is further reduced in the same range in the optical axis direction, and therefore the arrangement is more advantageous from the viewpoint of reducing eccentricity or inclination caused by an impact. Although impact resistance can be thus obtained simply by providing only three first protrusions 8a and/or only three third protrusions 9a identical in phase to the follower pins 7a, it is possible to obtain larger impact resistance by further providing three first protrusions 8a and/or three third protrusions 9a at locations opposed to the follower pins 7a, i.e. by providing six first protrusions 8a and/or six third protrusions 9a.

Figure 6:
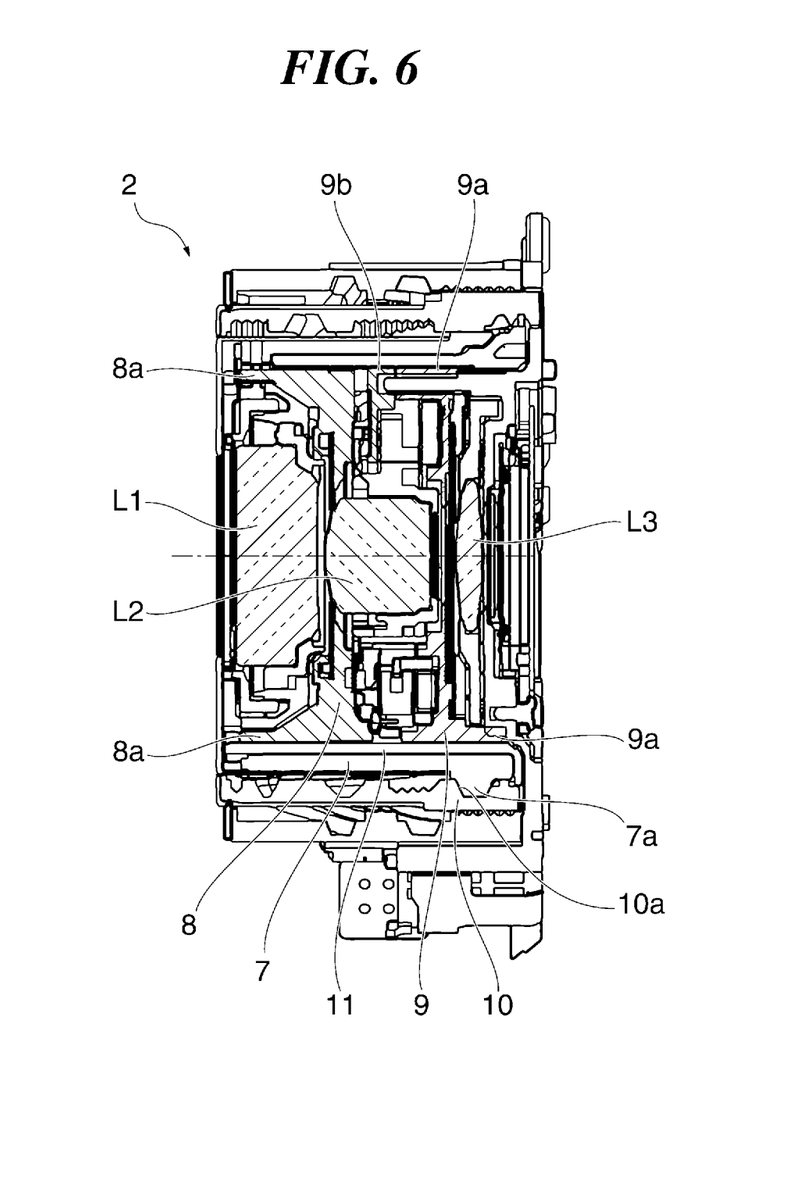
FIG. 6 is a cross-sectional view of the photographic lens barrel in FIG. 2, in a retracted state.
Figure 7:
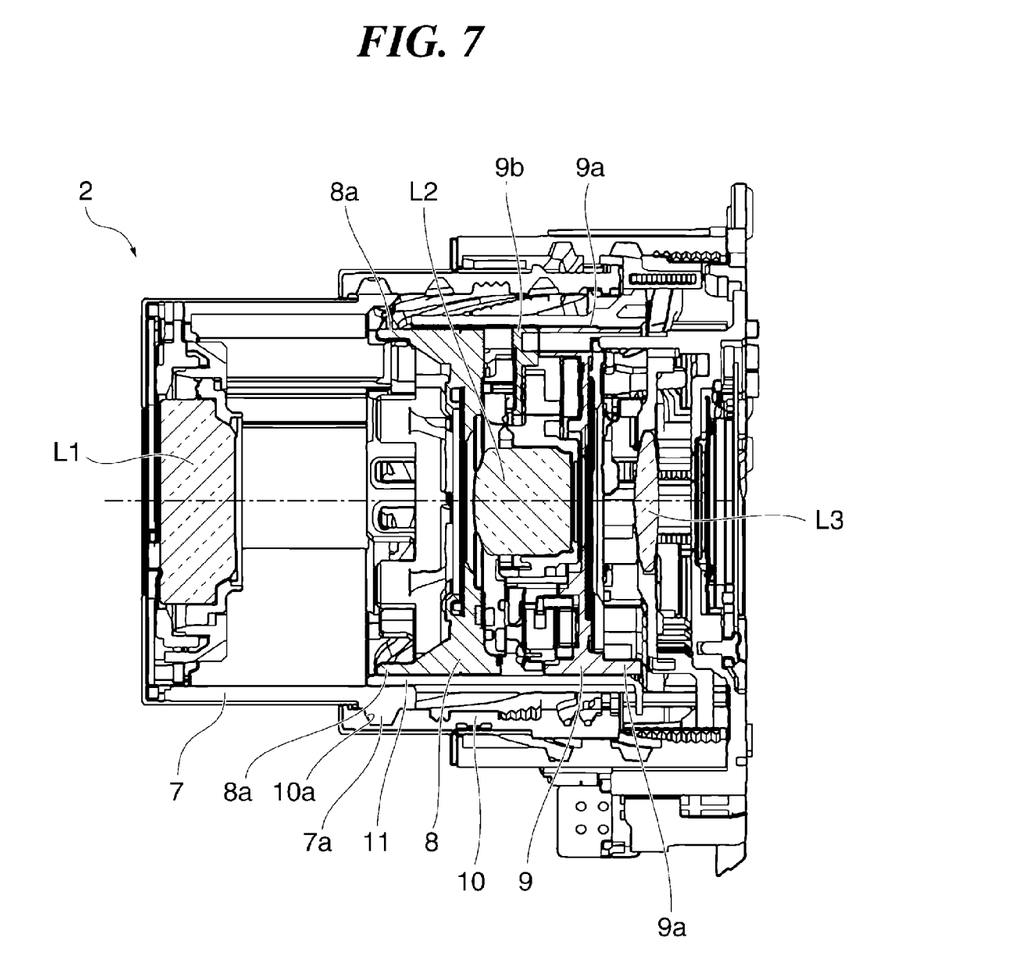
FIG. 7 is a cross-sectional view of the photographic lens barrel in FIG. 2, in a wide angle position as one of photographing states and in a normal state.
Figure 8:
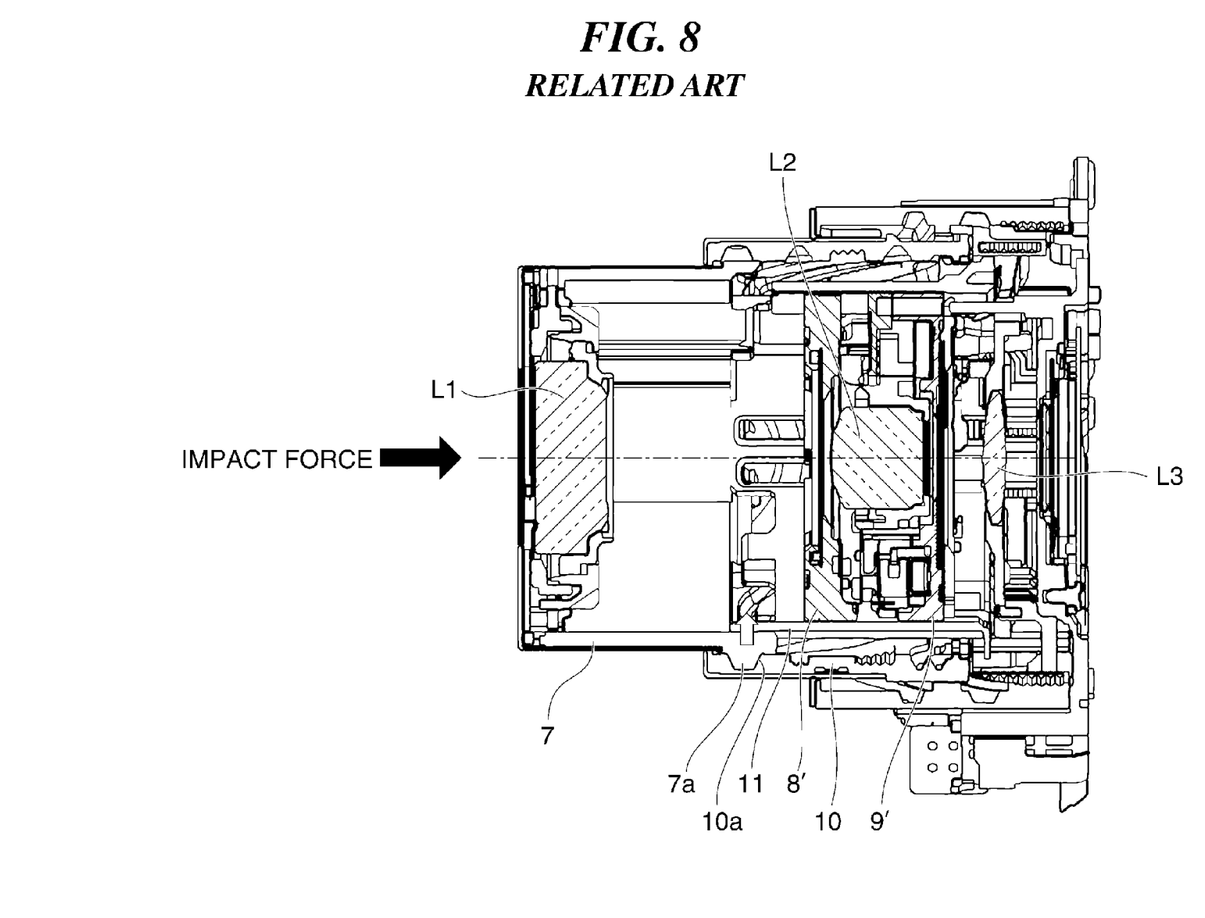
FIG. 8 is a cross-sectional view of a photographic lens barrel according to the related art, in the same wide angle position as shown in FIG. 7, and in a state where an impact force is applied thereto from the object side.
Figure 9:
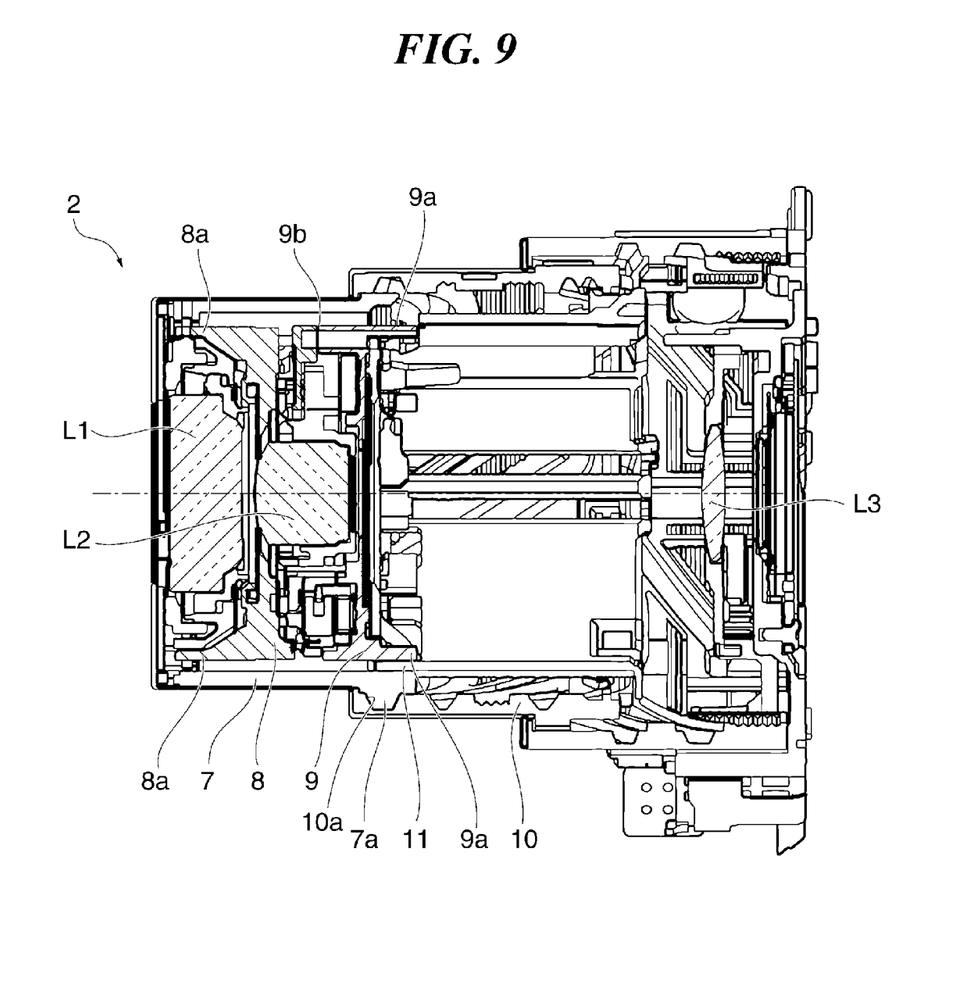
FIG. 9 is a cross-sectional view of the photographic lens barrel in FIG. 2, in a telephoto position as another of the photographing states and in the normal state.
Figure 10:
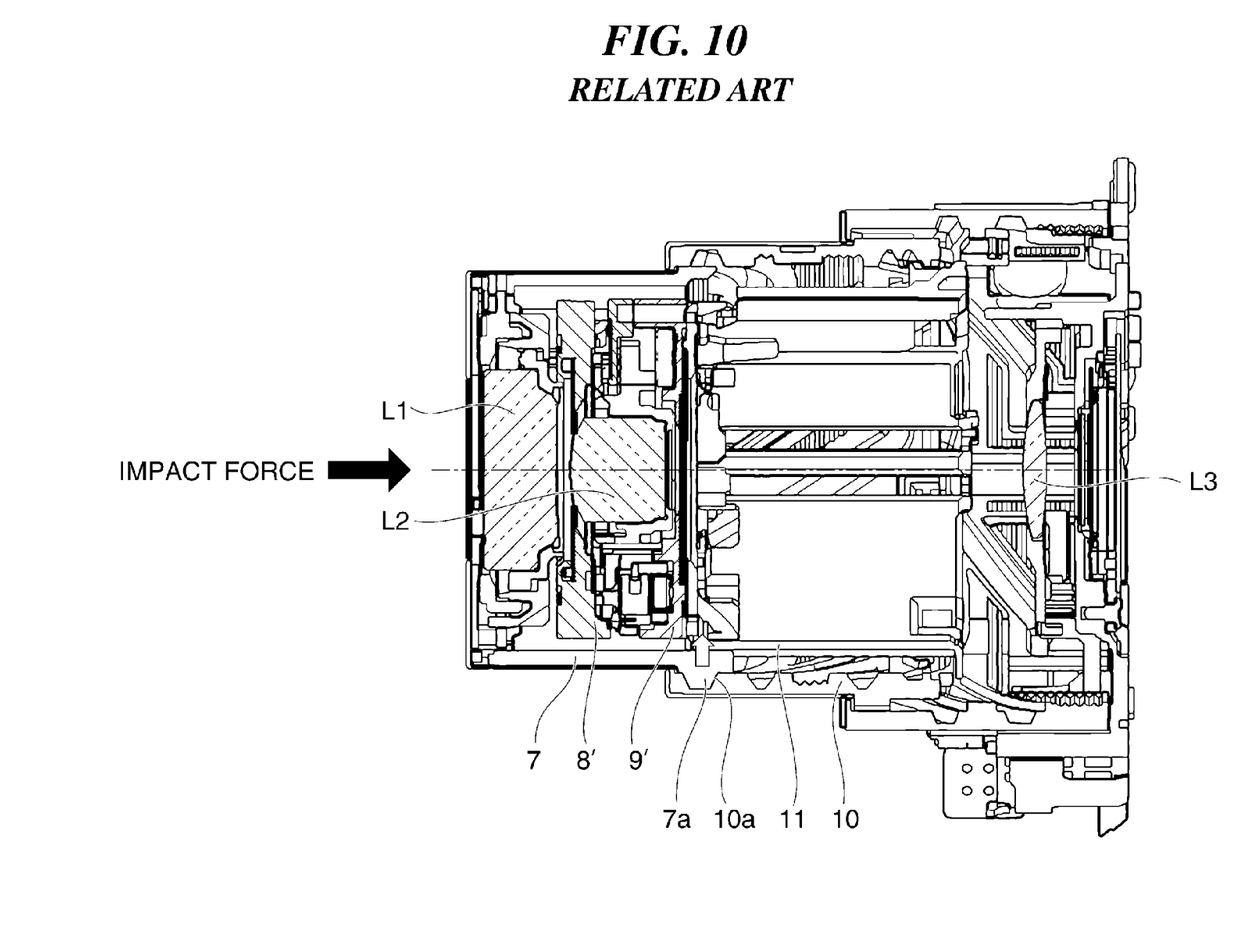
FIG. 10 is a cross-sectional view of the photographic lens barrel according to the related art, in the same telephoto position as shown in FIG. 9, and in a state where an impact force is applied thereto from the object side.

Next, a description will be given of how the diaphragm unit 8 and the second-group lens barrel 9 move when the photographic lens barrel 2 is operated to perform a zooming operation. FIG. 6 is a cross-sectional view of the photographic lens barrel 2 in a retracted state, i.e. in a non-photographing state. FIG. 7 is a cross-sectional view of the photographic lens barrel 2 in a wide angle position as one of photographing states, and shows a state where no impact force is applied to the photographic lens barrel 2. FIG. 8 is a cross-sectional view of a photographic lens barrel according to the related art, in the wide angle position, and shows a state where an impact force is applied thereto from the object side. FIG. 9 is a cross-sectional view of the photographic lens barrel 2 in a telephoto position, as another of the photographing states, and shows a state where no impact force is applied to the photographic lens barrel 2. FIG. 10 is a cross-sectional view of the photographic lens barrel according to the related art, in the telephoto position, and shows a state where an impact force is applied thereto from the object side.

The cross-sectional views of FIGS. 6, 7, and 9 are taken along a plane extending through the photographic lens barrel 2, which includes the center of one of the follower pins 7a of the first-group lens barrel 7 and the optical axis, so as to make it possible to grasp the positional relationship between respective ones of the first protrusion 8a of the diaphragm unit 8 and the third protrusion 9a of the second-group lens barrel 9 associated with the follower pin 7a, and the follower pin 7a. Further, the photographic lens barrel according to the related art, shown in FIGS. 8 and 10, is different from the photographic lens barrel 2 according to the present embodiment in the structure of the diaphragm unit and the second-group lens barrel, as described hereinafter. Now, it is assumed that the photographic lens barrel according to the related art, shown in FIGS. 8 and 10, includes a diaphragm unit 8' and a second-group lens barrel 9' different from the diaphragm unit 8 and the second-group lens barrel 9 included in the photographic lens barrel 2. In FIGS. 8 and 10, the photographic lens barrel according to the related art is taken along a plane including the center of one of the follower pins 7a of the first-group lens barrel 7 and the optical axis similarly to FIGS. 7 and 9 so as to make a comparison with FIGS. 7 and 9 easy to perform.

In the retracted state shown in FIG. 6, the photographic lens barrel 2 has been completely retracted into the camera body 1. Therefore, even when an impact is applied to the photographic lens barrel 2 e.g. due to a drop of the camera, no portion of the photographic lens barrel 2 directly receives the impact. As described hereinbefore, in the first-group lens barrel 7, the rectilinear motion barrel 11 is disposed radially inside the follower pins 7a, and further radially inside the rectilinear motion barrel 11, the third protrusions 9a formed on the second-group lens barrel 9 in a manner protruding toward the imaging surface are positioned. Furthermore, the first protrusions 8a of the diaphragm unit 8 and the third protrusions 9a of the second-group lens barrel 9 are arranged at the locations substantially identical in phase to the locations of the follower pins 7a, so that impact receiving portions are formed immediately below the follower pins 7a and the follower portions 8c and 9c and at the locations opposed to them in a manner continuous with each other in the optical axis direction. Therefore, even when a portion of the photographic lens barrel 2 directly receives an impact, the components cannot be displaced or disengaged from each other.

As shown in FIG. 7, when the image pickup apparatus 100 is powered on and the photographic lens barrel 2 is extended, the first-group photographic lens L1 held by the first-group lens barrel 7 and the second-group photographic lens L2 held by the second-group lens barrel 9 are maintained with a large space therebetween in the optical axis direction. A three-group type optical lens system shown in the present embodiment, which includes the third-group photographic lens L3 held by the third-group lens barrel, is configured such that to attain a high zoom magnification so as to raise lens specifications, the first-group photographic lens L1 and the second-group photographic lens L2 are further separated from each other in the wide angle position. More specifically, portions of the cam grooves formed in the cam ring 10, which are engaged with the follower pins 7a of the first-group lens barrel 7 in the wide angle position, are positioned closer to the object side, whereas portions of the cam grooves formed in the cam ring 10, which are engaged with the follower portions 9c of the second-group lens barrel 9, are positioned closer to the imaging surface side. In this state, the diaphragm unit 8 performs substantially the same motion as that of the second-group lens barrel 9. For this reason, there is a high possibility that no structure exists inside the follower pins 7a of the first-group lens barrel 7.

Now, impact resistance to be exhibited when an impact is applied from the front (object side) in the above-described state will be examined. In the photographic lens barrel, shown in FIG. 8, according to the related art, the follower pins 7a of the first-group lens barrel 7 are received only by the front end of the rectilinear motion barrel 11. In other words, the photographic lens barrel does not have a structure in which the diaphragm unit 8' receives the follower pins 7a via the rectilinear motion barrel 11 in the radial direction. In this case, when an impact is applied from the front (object side), there is a high possibility that the follower pins 7a of the first-group lens barrel 7 are moved radially inward by object-side tapered portions of the associated cam grooves 10a of the cam ring 10 and disengaged therefrom. Once disengaged from the cam grooves 10a, the follower pins 7a cannot be returned to original states by an ordinary operation, resulting in a lens error. When such a lens error occurs, the user cannot cope with the error for him/herself, and hence needs to request a manufacturer's service station for repair or the like.

In contrast, the photographic lens barrel 2 according to the present embodiment has the structure in which the follower pins 7a of the first-group lens barrel 7 are received by the front end of the rectilinear motion barrel 11 in the radial direction and further the inner peripheral surface of the rectilinear motion barrel 11 is received by the first protrusions 8a of the diaphragm unit 8, as shown in FIG. 7. This reduces the possibility that the follower pins 7a of the first-group lens barrel 7 are disengaged from the associated cam grooves 10a even when an impact is applied from the front (object side). In this case, as each of the first protrusions 8a is shorter in height from the circumferentially continuous portion of the diaphragm unit 8, the first protrusions 8a are more rigid. Therefore, by employing such a construction, it is possible to further improve the effect of preventing disengagement of the follower pins 7a of the first-group lens barrel 7.

When a zooming operation is performed to move the photographic lens barrel 2 from the wide angle position to the telephoto position, the first-group lens barrel 7 makes a U-motion by being temporarily retracted toward the imaging surface side and then being extended toward the object side, and the diaphragm unit 8 and the second-group lens barrel 9 continue to move approximately rectilinearly in the direction of extension. Meanwhile, the inside of each of the follower pins 7a of the first-group lens barrel 7 is always doubly received in the radial direction, i.e. by the rectilinear motion barrel 11, and an impact receiving portion, inside the rectilinear motion barrel 11, which changes according to the rectilinear movement of each of the diaphragm unit 8 and the second-group lens barrel 9, from the first protrusion 8a of the diaphragm unit 8, to the second protrusion 8b of the same, further to the fourth protrusion 9b of the second-group lens barrel 9, and finally to the third protrusion 9a of the same. That is, when the diaphragm unit 8 and the second-group lens barrel 9 move in the optical axis direction, the photographic lens barrel 2 as the optical device is switched between a first state in which the first protrusions 8a are positioned inside the follower pins 7a and a second state in which the third protrusions 9a are positioned inside the follower pins 7a.

As shown in FIG. 9, when the photographic lens barrel 2 is extended to the telephoto position, the first-group photographic lens L1 held by the first-group lens barrel 7 and the second-group photographic lens L2 held by the second-group lens barrel 9 are maintained with a space therebetween reduced to a minimum in the optical axis direction. In the three-group type optical lens system, the above-described problem occurring in the wide angle position also similarly occurs in the telephoto position. To attain a high zoom magnification so as to raise lens specifications, the photographic lens barrel as the optical device is constructed such that the first-group photographic lens L1 and the second-group photographic lens L2 are brought closer to each other in the telephoto position. More specifically, portions of the cam grooves formed in the cam ring 10, which are engaged with the follower pins 7a of the first-group lens barrel 7 in the telephoto position, and portions of the cam grooves formed in the cam ring 10, which are engaged with the follower portions 9c of the second-group lens barrel 9, are adjacent to each other at respective locations on the object side, and the diaphragm unit 8 performs substantially the same motion as that of the second-group lens barrel 9. For this reason, there is a high possibility that the diaphragm unit 8 and the second-group lens barrel 9 are brought into the first-group lens barrel 7 in a state close to each other, and no structure exists inside the follower pins 7a of the first-group lens barrel 7.

Now, impact resistance to be exhibited when an impact is applied from the front (object side) in the above-described state will be examined. In the photographic lens barrel, shown in FIG. 10, according to the related art, the follower pins 7a of the first-group lens barrel 7 are received only by the front end of the rectilinear motion barrel 11. In other words, the photographic lens barrel does not have a structure in which the second-group lens barrel 9' receives the follower pins 7a via the rectilinear motion barrel 11 in the radial direction. In this case, similarly to the case of the wide angle position, when an impact is applied from the front (object side), there is a high possibility that the follower pins 7a of the first-group lens barrel 7 are moved radially inward by the object-side tapered portion of the associated cam groove 10a of the cam ring 10 and disengaged therefrom.

In contrast, the photographic lens barrel 2 according to the present embodiment has a structure in which the follower pins 7a of the first-group lens barrel 7 are received by the front end of the rectilinear motion barrel 11 in the radial direction and further the inner peripheral surface of the rectilinear motion barrel 11 is received by the third protrusions 9a of the second-group lens barrel 9, as shown in FIG. 9. This reduces the possibility that the follower pins 7a of the first-group lens barrel 7 are disengaged from the cam grooves 10a of the cam ring 10 even when an impact is applied from the front (object side). In this case, as each of the third protrusions 9a is shorter in height from the circumferentially continuous portion of the second-group lens barrel 9, the third protrusions 9a are more rigid. Therefore, by employing such a construction, it is possible to further improve the effect of preventing disengagement of the follower pins 7a of the first-group lens barrel 7.

Figure 11:
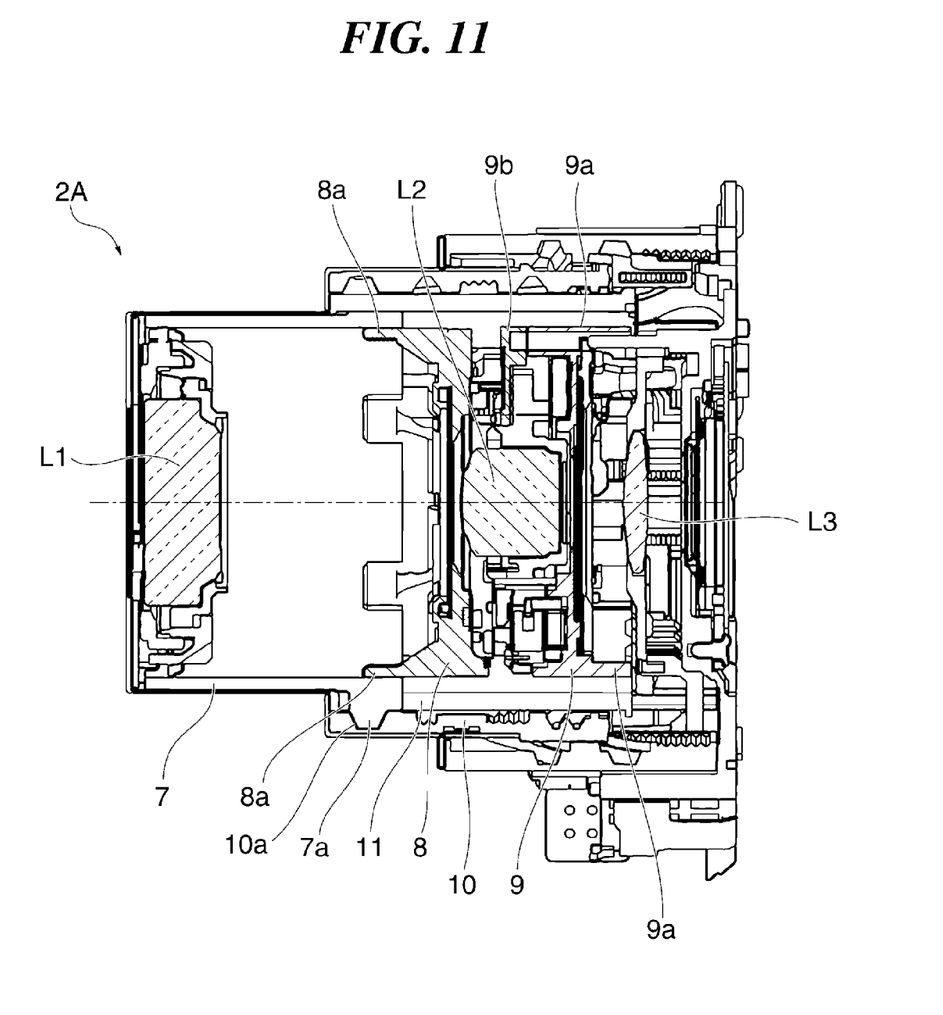
FIG. 11 is a cross-sectional view of a variation of the photographic lens barrel in FIG. 2, in the wide angle position.
Figure 12:
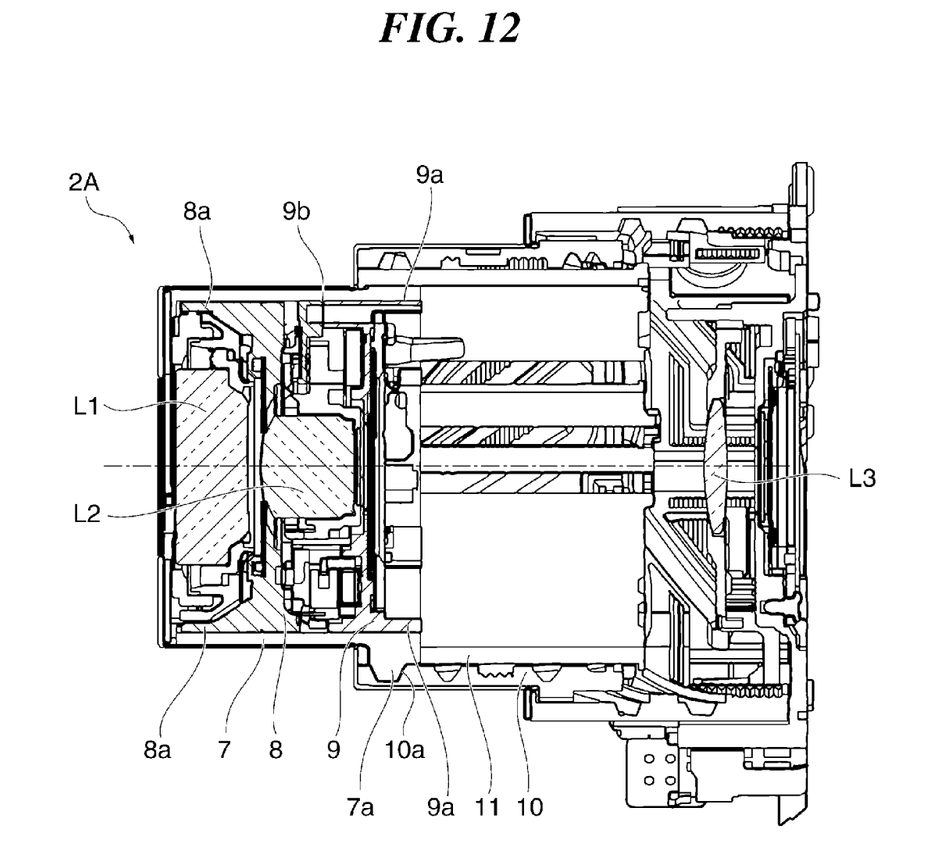
FIG. 12 is a cross-sectional view of the photographic lens barrel in FIG. 11, which is in the telephoto position.

Next, a description will be given, with reference to FIGS. 11 and 12, of impact resistance to be exhibited when the structure of the photographic lens barrel 2 is changed such that the rectilinear motion barrel 11 is disposed radially outside the first-group lens barrel 7. FIG. 11 is a cross-sectional view of a photographic lens barrel 2A as a variation of the photographic lens barrel 2, in the wide angle position, i.e. in one of the photographing states. FIG. 12 is a cross-sectional view of the photographic lens barrel 2A in the telephoto position, i.e. in another of the photographing states.

The photographic lens barrel 2A is distinguished from the photographic lens barrel 2 only in that the rectilinear motion barrel 11 is disposed radially outside the first-group lens barrel 7, and the other construction is the same as that of the photographic lens barrel 2. For example, in the photographic lens barrel 2, the diaphragm unit 8, the second-group lens barrel 9, the rectilinear motion barrel 11, the first-group lens barrel 7, and the cam ring 10 are radially arranged in the mentioned order from the inside, as shown in FIG. 7. On the other hand, in the photographic lens barrel 2A, the diaphragm unit 8, the second-group lens barrel 9, the first-group lens barrel 7, the rectilinear motion barrel 11, and the cam ring 10 are radially arranged in the mentioned order from the inside, as shown in FIG. 11.

The photographic lens barrel 2 is configured such that when an impact is applied to the photographic lens barrel 2 in the wide angle position, the follower pins 7a of the first-group lens barrel 7 having received the impact are received, via the rectilinear motion barrel 11 disposed radially inside the first-group lens barrel 7, by the first protrusions 8a of the diaphragm unit 8 disposed further radially inside the rectilinear motion barrel 11, to thereby prevent the follower pins 7a from being moved radially inward to be disengaged from the cam grooves 10a of the cam ring 10 (see FIG. 7). In contrast, the photographic lens barrel 2A is configured such that the first protrusions 8a of the diaphragm unit 8 disposed radially inside the follower pins 7a directly receive the follower pins 7a of the first-group lens barrel 7, as shown in FIG. 11. This makes it possible to improve impact resistance compared with a construction without the first protrusions 8a or any other member for receiving the follower pins 7a of the first-group lens barrel 7.

Further, the photographic lens barrel 2 is configured such that when an impact is applied to the photographic lens barrel 2 in the telephoto position, the follower pins 7a of the first-group lens barrel 7 having received the impact are received, via the rectilinear motion barrel 11 disposed radially inside the first-group lens barrel 7, by the third protrusions 9a of the second-group lens barrel 9 disposed further radially inside the rectilinear motion barrel 11, to thereby prevent the follower pins 7a from being moved radially inward to be disengaged from the cam grooves 10a of the cam ring 10 (see FIG. 9). In contrast, the photographic lens barrel 2A is configured such that the third protrusions 9a of the second-group lens barrel 9 disposed radially inside the follower pins 7a directly receive the follower pins 7a of the first-group lens barrel 7, as shown in FIG. 12. This makes it possible to improve impact resistance compared with a construction without the third protrusions 9a or any other member for receiving the follower pins 7a of the first-group lens barrel 7.

It should be noted that zooming operation for shifting the photographic lens barrel 2, 2A from the telephoto position to the wide angle position can be achieved simply by tracing back all the above-described operations of the respective components, and therefore description thereof is omitted.

As described above, according to the present embodiment, it is possible to prevent disengagement of the follower pins 7a of the first-group lens barrel 7 from the associated cam grooves 10a of the cam ring 10 by the first to fourth protrusions 8a, 8b, 9a, and 9b formed on the diaphragm unit 8 and the second-group lens barrel 9. This makes it possible to improve the impact resistance of the photographic lens barrel 2, thereby enhancing the reliability of the image pickup apparatus 100. Further, according to the present embodiment, since it is not required to increase the diameter of any of the components constituting the photographic lens barrel 2, 2A, the size of the photographic lens barrel 2, 2A is not increased, and therefore it is possible to avoid increasing the size of the image pickup apparatus 100 including the photographic lens barrel 2, 2A as the optical device.

While the invention has been described with reference to exemplary embodiments, it is to be understood that the invention is not limited to the disclosed exemplary embodiments. The scope of the following claims is to be accorded the broadest interpretation so as to encompass all modifications, equivalent structures and functions. Further, the embodiment and variation of the invention are described only by way of example, and it is possible to modify the embodiment and the variation on an as needed basis. For example, although in the above description, the photographic lens barrel 2, 2A is comprised of three lens groups, the photographic lens barrel may be comprised of more than three lens groups. Furthermore, in the photographic lens barrel 2, 2A, the diaphragm unit 8 is disposed on the object side and the second-lens barrel 9 is disposed on the imaging surface side, but this is not limitative. More specifically, insofar as the features of the invention are provided, the photographic lens barrel may be configured such that the lens holding members are disposed on the object side, and an aperture shutter and other kinds of light amount adjustment members are disposed in combination on the imaging surface side.

This application claims the benefit of Japanese Patent Application No. 2013-157565 filed Jul. 30, 2013, which is hereby incorporated by reference herein in its entirety.

What is claimed is:

1. An optical device comprising:

a lens holding member configured to hold a first lens, and having a plurality of follower pins formed thereon in a radially protruding manner;

a cam member disposed outside said lens holding member and having a cam groove formed therein for engagement with any one of said follower pins;

a first moving member disposed on an image surface side of said lens holding member in an optical axis direction and configured to move in the optical axis direction; and a second moving member disposed on an image surface side of said first moving member in the optical axis direction, configured to move in the optical axis direction, and configured to hold a second lens, wherein said first moving member has a plurality of first portions formed thereon, each of said plurality of first portions comprising a protrusion extending toward an object side, wherein said second moving member has a plurality of second portions formed thereon, each of said plurality of second portions comprising another protrusion extending toward the image surface side, wherein in a case where said first moving member and said second moving member move in the optical axis direction, the optical device is switched between a wide angle position in which one of said plurality of first portions and said any one of said follower pins are aligned in a radial direction of the optical device, and a telephoto position in which one of said plurality of second portions and said any one of said follower pins are aligned in the radial direction of the optical device, the second lens and said plurality of first portions being disposed on the object side of said plurality of second portions and said plurality of follower pins aligned when in the telephoto position, and wherein another plurality of said first portions and another plurality of said second portions are formed at respective locations different in phase by 180 degrees from the location where said any one of said follower pins is formed, and are not aligned with each of the plurality of follower pins in the radial direction of the optical device.

2. The optical device according to claim 1, wherein each of said plurality of first portions is formed in a manner protruding forward from said first moving member in the optical axis direction, and wherein each of said plurality of second portions is formed in a manner protruding rearward from said second moving member in the optical axis direction.

3. The optical device according to claim 2, further comprising:

a guide member configured to guide said lens holding member, said first moving member, and said second moving member such that said lens holding member, said first moving member, and said second moving member move rectilinearly in the optical axis direction, in a case where said cam member is rotated, and wherein the one of said plurality of first portions and the one of said plurality of second portions are formed at respective locations identical in phase to the location where said any one of said follower pins is formed.

4. The optical device according to claim 3, wherein said guide member is disposed in the optical device such that at least part of said guide member is positioned between said plurality of follower pins and said plurality of first portions.

5. The optical device according to claim 3, wherein said guide member is disposed in the optical device such that at least part of said guide member is positioned outside said plurality of follower pins.

6. The optical device according to claim 1, wherein said first moving member holds a light amount adjustment unit.

7. The optical device according to claim 1, wherein each of said plurality of first portions and each of said plurality of second portions are disposed at the same distance from the optical axis as each other.

8. The optical device according to claim 1, wherein the one of said first portions and the one of said second portions are aligned with each other in a radial direction of the optical device at the one of the follower pins.

* * * * *